3,047,503
POLYCYCLIC POLYPHENOLS
Gunter S. Jaffe, Oakland, Albert L. Rocklin, Walnut Creek, and John L. Van Winkle, San Lorenzo, Calif., assignors to Shell Oil Company, New York, N.Y., a corporation of Delaware
No Drawing. Filed July 11, 1960, Ser. No. 41,735
15 Claims. (Cl. 252—52)

This invention relates to novel polynuclear phenols and to their preparation. More particularly, the invention relates to new phenolic antioxidant compounds and to their preparation from dialkyl hydroxybenzyl alcohol.

Such alkylated phenols as 2,6-di-tert-butyl-4-methylphenol and bis(3,5-di-tert-butyl-4-hydroxyphenyl)methane are well known as antioxidants for such substrates as fuels, including gasoline and fuel oil, lubricants, such as motor oils and greases, and the like. For applications wherein the stabilized substrate is exposed to high temperatures in preparation or use, these phenolic materials are somewhat too volatile and tend to evaporate out of the mixture.

It has now been found that phenolic antioxidants having excellent stabilizing properties combined with low volatility can be prepared by reacting certain alkylated hydroxybenzyl alcohols with polycyclic aromatic hydrocarbon compounds. It is therefore an object of the invention to provide novel polynuclear phenolic compounds. Another object of the invention is the provision of stabilized compositions containing such polynuclear phenols. Still another object of the invention is the provision of a process for preparing such polynuclear phenols. Other objects will be apparent from the following description of the invention.

These objects are accomplished in the invention by the polynuclear phenol which comprises a condensed polycyclic hydrocarbon aromatic nucleus, said nucleus having at least one 3,5-dialkyl-4-hydroxybenzyl substituent attached to a ring carbon atom. The polynuclear phenol may thus be generally described by the formula

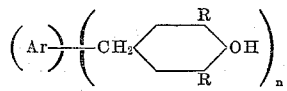

where Ar is a polycyclic hydrocarbon aromatic nucleus, each R is an alkyl group, preferably having from 1 to 8 carbon atoms, and $n$ is a positive integer, preferably 1 to 4. Compounds having the best antioxidant properties are those wherein at least one, and most preferably both, of the alkyl groups R, is branched on the alpha carbon atom.

By polycyclic hydrocarbon aromatic nucleus is meant a nucleus which has more than one six-membered aromatic ring, but which does not contain an atomic bridge, a crossed valence bridge, or a free spiro union. Such ring systems are generally referred to as fused ring systems. While systems having large numbers of condensed rings may serve as nuclei for the compounds of the invention, systems having up to four rings are preferred. Such systems may be unsubstituted or they may be substituted with alkyl groups, preferably those having no more than four carbon atoms.

Typical of compounds represented by the noted formula are alpha(3,5-diisopropyl-4-hydroxybenzyl)naphthalene; 1 - methyl - 3(3 - methyl - 5 - tert-butyl - 4 - hydroxybenzyl)naphthalene; 2 - methyl-6-(3,5-di-tert-butyl-4-hydroxybenzyl)naphthalene; 1,4 - bis(3,5-di-tert-amyl-4-hydroxybenzyl)naphthalene; 1,6 - bis(3,5-di-tert-butyl-4-hydroxybenzyl)naphthalene; 1,4,5,8-tetra(3,5-di-tert-butyl-4-hydroxybenzyl)naphthalene.

Three-ring polycyclic phenols of the invention are represented by 9-(3,5-diisopropyl-4-hydroxybenzyl)anthracene; 9,10 - bis(3,5-di-tert-butyl-4-hydroxybenzyl)anthracene; 9-(3,5-di-tert-amyl-4-hydroxybenzyl)phenanthrene; 9,10 - bis(3 - methyl - 5 - tert-hexyl - 4 - hydroxybenzyl)phenanthrene; 1,2,9 - tri(3 - ethyl-5-isopropyl-4-hydroxybenzyl)phenanthrene; 1-methyl-9-(3,5-di-tert-amyl-4-hydroxybenzyl)phenanthrene; 1,2,9,10 - tetra(3,5 - di - tert-butyl-4-hydroxybenzyl)phenanthrene; and 1,4,5,8,9,10-hexa(3,5-diisopropyl-4-hydroxyphenyl)anthracene.

Four-ring polycyclic phenols are typified by 5,6,11,12-tetra(3,5 - di-tert-butyl-4-hydroxybenzyl)naphthacene; 6-(3,5-diisopropyl-4-hydroxybenzyl)chrysene; 3-(3,5-di-tert-amyl-4-hydroxybenzyl)pyrene; and 10-(3,5-di-tert-hexyl-4-hydroxybenzyl)-1,2-benzanthracene. In general, at least one and generally two 3,5-dialkyl-4-hydroxybenzyl radicals can be alkylated on each ring of the polynuclear hydrocarbon. Thus, to the bicyclic compound naphthalene can be conveniently added up to four of such radicals, while the tricyclic hydrocarbon anthracene may be readily substituted with up to six radicals. As a consequence, where the polynuclear hydrocarbon has $m$-fused six-membered rings, where $m$ is an integer from 2 to 6 and preferably from 2 to 4, it may easily be alkylated under the conditions of the invention with up to 2$m$ 3,5-dialkyl-4-hydroxybenzyl radicals. The structural formula for substituted naphthalene compounds will be

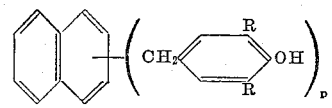

where $p$ is an integer from 1 to 4; while for substituted anthracenes the structure would be

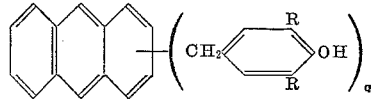

where $q$ is an integer from 1 to 6. Substituted phenanthrenes would, of course, be similarly described. In addition to the hydroxybenzyl substituents specified, the polycyclic aromatic nuclei may, of course, be substituted with other hydrocarbyl radicals, particularly lower alkyl radicals, e.g., up to $C_4$ alkyls including methyl, ethyl, isopropyl and the like.

Compounds of this type are readily prepared by the alkylation of polycyclic aromatic hydrocarbons with 3,5-dialkyl-4-hydroxybenzyl alcohol in the presence of sulfuric acid or a Friedel-Crafts catalyst. Since at room temperature the reactants are generally solids, the alkylations are preferably conducted in the liquids phase in an inert solvent.

The aromatic polycyclic hydrocarbon reactants are those polynuclear hydrocarbons having from two to six but preferably two to four rings. Representative of such compounds are fluorene; naphthalene; alpha- and beta-methyl naphthalene; 2,6-dimethyl naphthalene; anthracene; 1,5-dimethylanthracene; phenanthracene; perylene; retene; acenaphthene; naphthacene; chrysene; triphenylene; pyrene; 1,2-benzanthracene; 2,3-benzanthracene; as well as pentacene; 2,3,6,7-dibenzanthracene; and coronene. Useful polycyclic phenols may also be readily and inexpensively prepared by alkylation of commercial mixtures of such compounds, such as mixed methyl and dimethyl naphthalenes, obtained from destructive distillation of coal. Mixed polycyclic aromatics such as are obtained in refinery operations, generally by phenol or furfural extractions of cracked gas-oil, are also suitable for use in the process. In general, all of these alkylatable aromatic hydrocarbons are characterized by having at least one replaceable hydrogen atom on one of the ring carbon atoms, and preferably at least two replaceable hydrogen atoms on ring carbon atoms. Since among the most preferred compounds of the invention are those polycyclic aromatic hydrocarbons having two 3,5-dialkyl-4-hydroxybenzyl radicals attached to the same ring, e.g., 9,10 - bis(3,5 - di - tert - butyl - 4 -hydroxybenzyl)anthracene; 1,4-bis(3,5-diisopropyl-4-hydroxybenzyl) naphthalene; one desirable class of polycyclic aromatic hydrocarbons is that having a replaceable hydrogen atom on each of two carbon atoms on the same ring.

These aromatics are alkylated with 3,5-dialkyl-4-hydroxybenzyl alcohol to form the novel compounds of the invention. The alcohol employed preferably had the formula

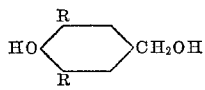

wherein each R is alkyl, preferably having up to eight carbon atoms. The alcohol may, of course, have other such alkyl substituents on the ring in the 2- and 6-positions. The most effective antioxidants are prepared from hydroxybenzyl alcohols wherein the hydroxyl group is sterically hindered by the adjacent alkyl groups, and for this reason it is preferred that at least one and preferably both of the alkyl groups R on the benzyl ring be branched on the alpha carbon atoms. Typical alcohols include 3,5-dimethyl-4-hydroxybenzyl alcohol; 3-ethyl-5-butyl-4-hydroxybenzyl alcohol; 3-hexyl-5-octyl-4-hydroxybenzyl alcohol; and 3,5-dioctyl-4-hydroxybenzyl alcohol. Preferred alcohols having branched alkyl substituents R include 3-methyl-5-isopropyl-4-hydroxybenzyl alcohol, 3-ethyl-5-tert-butyl-4-hydroxybenzyl alcohol; 3-butyl-5-tert-amyl-4-hydroxybenzyl alcohol and 3-octyl-5-tert-hexyl-4-hydroxybenzyl alcohol. Most preferred alcohols, wherein both of the alkyl substituents R are branched on the alpha carbon atom are exemplified by 3,5-diisopropyl-4-hydroxybenzyl alcohol; 3,5-di-tert-butyl-4-hydroxybenzyl alcohol; 3-isopropyl-5-tert-butyl-4-hydroxybenzyl alcohol; 3,5-di-tert-amyl-4-hydroxybenzyl alcohol, and the like.

The polycyclic hydrocarbon and the hydroxybenzyl alcohol are reacted together under alkylating conditions in the presence of a catalytic amount of a compound selected from sulfuric acid and Friedel-Crafts catalysts. By Friedel-Crafts catalysts are meant such catalysts as aluminum trihalides, such as aluminum trichloride and aluminum tribromide; zirconium tetrachloride; tantalum pentachloride; beryllium dichloride; titanium tetrachloride, boron trifluoride; hydrogen fluoride; tin tetrachloride; ferric trichloride and zinc dichloride. The catalyst is employed in amounts ranging from about 0.1% to about 100% by weight, based on the hydroxylbenzyl alcohol, with the preferred amount being from about 1% to about 10% on the same basis, although a catalyst such as sulfuric acid may be used in large excess and then recycled.

The reaction is facilitated if a dehydrating agent is employed with the Friedel-Crafts catalyst. Of these agents, the most effective is phosphorus pentoxide. The amount employed is preferably that percentage by weight about equal to the amount of catalyst used.

The reaction is conducted in the liquid phase most conveniently in solution in an inert solvent. Suitable solvents include the paraffins, particularly those having between five and ten carbon atoms, such as pentane, isopentane, hexane, cyclohexane, heptane, octane, isooctane and decane; as well as the mixture of hydrocarbons known as "petroleum ether." Also useful are the alkylene halides such as methylene chloride, ethylene dichloride, propylene dibromide and the like, alkylene halides up to C₄ being preferred. Ethers such as diethyl ether, methyl ethyl ether, diisopropyl ether and dioxane may also be used. In general, solvents liquid at the reaction temperautre and boiling at or above about 50° C. are most useful.

The alkylation of the polycyclic polyaromatic hydrocarbon with the 3,5-dialkyl-4-hydroxybenzyl alcohol of the invention is conveniently conducted at atmospheric pressure and below the boiling temperature of the solvent, i.e., at temperatures between about −15° C. to about 100° C. While subatmospheric or superatmospheric pressures may be employed, their use only increases the expense of the process without affording material advantages in rate or yield. Since the alkylation under the conditions described takes place with convenient rapidity at temperatures at or below about 50° C., higher temperatures will generally not be required.

The reaction is readily performed by mixing the reactants and catalysts in the solvent and, after the reactants have been consumed to the desired degree, terminating the reaction by inactivating the catalyst with water, complexing, or by some other method known in the art. The product may be simply separated from the reaction mixture by such methods as distillation, extraction, crystallization or the like. While this description has set forth the process in terms of a batch process, the reaction may also be conducted in a semi-batch or continuous manner.

The pure products are white or light-colored crystalline solids at room temperature and usually have relatively high melting and boiling points. They are insoluble in water but soluble in hydrocarbon and polar organic solvents and generally miscible with organic solid substrates. They have superior thermal stabilizing properties and relatively low volatility and are therefore particularly effective as antioxidants for materials which during preparation or use are subjected to elevated temperatures. Examples of such materials are elastomers or rubbers, both natural and synthetic, and polymerized alpha-olefins and copolymers thereof, and lubricants such as oils and greases.

One class of compositions of particular interest are those comprising a polymerized alpha-olefin containing a stabilizing amount of the 3,5-dialkyl-4-hydroxybenzyl aromatic hydrocarbons of the invention wherein each of the alkyl radicals on the hydroxybenzyl radical has from 3 to 8 carbon atoms and is branched on the alpha carbon atom. Preferred polymers for the compositions of this invention are those normally solid polymers of alpha-olefins having up to three carbon atoms, e.g., ethylene and propylene, and their copolymers.

The polymers of alpha-olefins stabilized by the compounds of the invention are those normally solid hydrocarbon polymeric materials which are obtained by polymerizing such mono-olefins as ethylene; propylene; butene-1; pentene-1; 3-methyl-butene-1; hexene-1; 4-methyl-pentene-1; 4-methyl-hexene-1; 4,4-dimethyl-pentene-1; and the like, as well as their copolymers, e.g., ethylene-propylene copolymers and the like. By "stabilizing amount" is meant an amount of the hydroxybenzyl compound sufficient to stabilize the composition against oxidative, thermal and untraviolet deterioration, generally from about 0.005%w to about 1%w of the total composition.

The polymers are preferably those prepared by low-pressure polymerization methods and, accordingly, they may contain trace amounts of metallic catalyst residues, particularly transition metals of groups IV–VI of the Mendeleeff Periodic Table, and metal residues of a group I–III metal. For example, many low-pressure polymers will contain traces of titanium and aluminum or such other metals as vanadium and zirconium, depending on the particular "Ziegler" catalyst employed in the polymerization. Additionally, the polymers often may contain small amount of free iron or iron salts, impurities which are incorporated in the polymer from the steel apparatus in which polymerization is conducted.

The polymeric alpha-olefin may be in the form of molding powder, sheets, films, rods, tube, molded forms or the like. Irrespective of the physical form of the polymer, the novel hydroxybenzyl chlorides of the invention are useful to impart improved resistance to all forms of embrittlement and degradation.

Typical elastomers in which the polycyclic compounds of the invention may be employed include natural rubber (*Hevea brasiliensis*) and such synthetic rubberlike elastomers as SBR, polybutadiene, cis 1,4-polyisoprene, neoprene, butyl rubber and polyacrylonitrile. All of these deteriorate in the presence of oxygen and ozone by hardening, cracking and checking, and thus losing their resilience and mechanical strength. When these rubbers are processed, as by milling, curing or molding, they are subjected to high temperatures which tend to volatilize some or all of the stabilizer in the rubber. However, the incorporation into the rubber of the hydroxybenzyl polycyclic compounds of the invention renders the resulting rubber composition resistant to oxidative deterioration during processing, since these novel stabilizers are both heat-stable and relatively non-volatile. As a consequence, the rubber compositions stabilized with these compounds have better retention of color, strength, elasticity and resistance to cracking, checking and tearing than rubber compositions containing less stable antioxidants. The polycyclic compounds may thus be added to the rubber at the latex stage during processing on Banbury mills or included with other substances added to the rubber during the course of manufacture. They are also sufficiently soluble in such hydrocarbons as gasoline, fuel oil, and lubricating oils and greases so that they may be incorporated in stabilizing amounts in such materials. Alternatively, they may be employed as inhibitors in such polymerizable liquid ethylenically unsaturated monomers as vinylbenzenes, including styrene, vinyltoluene and divinylbenzene; acrylates, including methyl acrylate, ethyl acrylate and 2-ethylhexyl acrylate; methacrylates, including methyl methacrylate and ethyl methacrylate; acrylonitrile, and the like, where traces of oxygen in the monomer may initiate undesirable premature polymerization.

In general, in the stabilized compositions containing the novel polycyclic compounds described, only an amount of any particular compound sufficient to stabilize the material against oxidative deterioration will be required. The requisite amount will, of course, depend both on the efficacy of the particular polycyclic compound and on the nature of the normally oxidizable substrate in which it is employed. It has been found that amounts of the polycyclic compounds from about 0.0001% by weight to about 10% by weight, based on the organic substrate, are sufficient. For example, suitable concentrations of the polycyclic compounds in distillate fuels, e.g., kerosene, furnace oil, are on the order of 0.0007%w to about 0.0028%w, while in rubber somewhat larger amounts, up to about 10%w, are required.

It will be understood that, in addition to containing a stabilizing amount of the dialkyl hydroxybenzyl polycyclic compounds described, the organic compositions of the invention may contain such other ingredients as other antioxidants, coloring agents, and the like. For example, in rubber or plastic compositions such additives as pigments, fillers, antiozonants and curing agents will be employed, while in fuel compositions such additives as anti-icing agents, dyes, antiknock and anti-miss agents and similar conventional ingredients will be found. Lubricants will contain gelling agents, extreme pressure additives, and such other materials as are employed in commercial preparations. These additives will not interfere with the superior stabilizing effect of the hydroxybenzyl polycyclic compounds of the invention.

To illustrate the novel polycyclic compounds of the invention, their preparation and their uses, the following examples are given. It should be understood, however, that these examples are merely illustrative and are not to be regarded as limitations to the appended claims since the basic teachings thereof may be varied as will be understood by one skilled in the art. In the examples, the proportions are expressed in parts by weight unless otherwise noted.

EXAMPLE I

To a 500-ml. flask was charged 47.20 g. (0.1 mole) of 3,5-di-tert-butyl-4-hydroxybenzyl alcohol, 18.6 g. (0.1 mole) of 95% anthracene, and 200 ml. methylene chloride. The resulting solution was stirred at 2° C. and to it was added 40 g. (25 ml.) of 80% sulfuric acid over a 17-minute period. The reaction mixture was then allowed to warm slowly to room temperature. At the end of 2½ hours, the reaction was terminated by addition of 100 ml. of ice water.

The mixture was filtered and washed to yield 11.66 g. of a yellow solid. This was recrystallized from a solution of 160 ml. benzene/425 ml. isooctane after decolorization of the solution with charcoal. From this solution was obtained 9.6 g. of a light yellow precipitate. On evaporation of the methylene chloride filtrate there was obtained another 47.7 g. of crude product from which there was recovered 33.0 g. purified material on recrystallization, a total of about 42.6 g. (70%) of a compound which upon analysis proved to be 9,10-bis(3,5-di-tert-butyl-4-hydroxybenzyl)anthracene, having a melting point of 232.4–233.4° C.

|  | C | H |
| --- | --- | --- |
| Analysis calculated | 86.1 | 8.86 |
| Found | 86.0 | 8.9 |

When the polynuclear aromatic hydrocarbon employed is phenanthrene, the product is 9,10-bis(3,5-di-tert-butyl-4-hydroxybenzyl)phenanthrene.

EXAMPLE II

Employing the method of the previous example, 0.15 mole of 3,5-diisobutyl-4-hydroxybenzyl alcohol is reacted at about 25° C. with 0.1 mole of naphthalene in ethylene dichloride in the presence of 10%w of ethereal boron trifluoride. Upon workup, the product 1,4-bis(3,5-diisopropyl-4-hydroxybenzyl)naphthalene is obtained in good yield.

EXAMPLE III

As in the previous example, 0.2 mole of 3,5-di-tert-amyl-4-hydroxybenzyl alcohol is reacted with 0.1 mole of beta-methyl naphthalene in dioxane in the presence of 12%w sulfuric acid at about 50° C. Upon workup, a good yield of 2-methyl-5-(3,5-di-tert-amyl-4-hydroxybenzyl) naphthalene is obtained.

EXAMPLE IV

When samples of natural rubber, each containing 1%w of one of the substituted naphthalenes of Examples II and III, are subjected to exposure to sunlight and oxygen, such samples have considerably more resistance to cracking, checking and tearing than rubber samples containing no stabilizing agent.

EXAMPLE V

The 9,10-bis(3,5-di-tert-butyl-4-hydroxybenzyl)anthracene prepared in Example I was evaluated as an antioxidant in polypropylene. Polypropylene film samples each containing 0.25% or 0.5% by weight of the compound were tested by heat aging, outdoor exposure and Fadeometer. The resulting data are presented in Table I.

In the heat aging test, polypropylene film samples five mils in thickness were maintained in an oven at 133° C. Each sample was tested for loss of elongation three times a day until the film tore easily. The number of days shown on the table are the total elapsed days before the film tested lost its tensile strength and flexibility. It will be seen from the table that the compound increased the heat stability of the polypropylene by a factor of about 20.

In the outdoor exposure test, five mil film samples of polypropylene were exposed on the laboratory roof at Emeryville, California, at a 45° angle toward the south and periodically tested by bending through 180°. The number of weeks required before the films so tested snapped on bending is shown in the table. It will be seen that the compound increased the weather stability of the polypropylene by a factor of about 5.

In the accelerated Fadeometer test, the conventional Atlas Weatherometer is used, but the arc light source has been supplemented by addition of eight fluoroescent ultraviolet light sources. All film samples tested pass within a quarter inch of the light sources. It has been found that in this accelerated exposure test, conditions are approximately eight times as stringent as in the unmodified Weatherometer.

Table I

| Additive | Heat Aging, Days | Outdoor Exposure, Weeks | Accelerated Fadeometer, Days |
|---|---|---|---|
| None | <0.5 | ~0.5 | 2.5 |
| 0.25% W | 11 | 3.5 | 3 |
| 0.50% W | 13 | 2.5 | 3 |

EXAMPLE VI

A sample of the compound of Example I was tested in white mineral oil at 150° C. by the Dornte method, see I and EC 34, 927 (1942). The results of this test are set forth in Table II below.

Table II

| Additive | Conc., Percent W | Induction Period, Hours |
|---|---|---|
| None | 0 | 1 |
| 9,10-Bis(3,5-di-tert-butyl-4-hydroxybenzyl) anthracene | 0.32 | 8 |

It will be seen from these data that with the aid of the anthracene compound an eight-fold enhancement of the oxidation stability of the oil is obtained.

We claim as our invention:

1. The polynuclear phenol comprising a polycyclic hydrocarbon aromatic nucleus, comprising up to six six-membered fused rings, and said nucleus having at least one 3,5-dialkyl-4-hydroxybenzyl substituent, wherein each alkyl radical has up to 8 carbon atoms, attached to a ring carbon atom.

2. The polynuclear phenol comprising a bicyclic hydrocarbon aromatic nucleus, comprising two fused six-membered rings and having a 3,5-dialkyl-4-hydroxybenzyl substituent wherein each alkyl radical has up to 8 carbon atoms attached to each of from one to four ring carbon atoms.

3. The polynuclear phenol comprising a tricyclic hydrocarbon aromatic nucleus comprising three fused six-membered rings and having a 3,5-dialkyl-4-hydroxybenzyl substituent wherein each alkyl radical has up to 8 carbon atoms, attached to each of from one to six ring carbon atoms.

4. The polynuclear phenol comprising a polycyclic hydrocarbon aromatic nucleus having up to four fused six-membered rings and having a 3,5-dialkyl-4-hydroxybenzyl substituent wherein each alkyl radical has up to 8 carbon atoms, attached to each of two ring carbon atoms, both of said carbon atoms being contained in the same ring.

5. 9,10-bis(3,5-dialkyl - 4 - hydroxybenzyl)anthracene, wherein each of the alkyl groups has up to 8 carbon atoms and at least one of the alkyl groups is branched on the alpha carbon atom.

6. 1,4-bis(3,5-dialkyl - 4 - hydroxybenzyl)naphthalene, wherein each of the alkyl groups has up to 8 carbon atoms and at least one of the alkyl groups is branched on the alpha carbon atom.

7. The stabilized composition consisting essentially of a hydrocarbon material normally subject to oxidative deterioration containing the polynuclear phenol of claim 1 in amount sufficient to stabilize the composition against oxidative deterioration.

8. The stabilized composition consisting essentially of a polymerized alpha-olefin containing an amount of 9,10-bis(3,5-dialkyl-4-hydroxybenzyl)anthracene, wherein each alkyl radical has up to 8 carbon atoms, sufficient to stabilize the composition against oxidative deterioration.

9. The stabilized composition consisting essentially of polypropylene containing a stabilizing amount of 9,10-bis(3,5-di-tert-butyl-4-hydroxybenzyl)anthracene.

10. The stabilized composition of claim 7 wherein the hydrocarbon is lubricating oil.

11. The process of preparing a polynuclear phenol which comprises reacting together in the liquid phase 3,5-dialkyl-4-hydroxybenzyl alcohol, wherein each alkyl radical has up to 8 carbon atoms, and a polycyclic aromatic hydrocarbon having up to six-membered fused rings, in the presence of a catalytic amount of a compound selected from the group consisting of sulfuric acid and Friedel-Crafts catalysts.

12. The process of preparing a polynuclear phenol which comprises reacting together in the liquid phase 3,5-dialkyl-4-hydroxybenzyl alcohol, wherein each alkyl radical has up to 8 carbon atoms, and anthracene in the presence of a catalytic amount of sulfuric acid.

13. The stabilized composition consisting essentially of rubber containing the polynuclear phenol of claim 1 in an amount sufficient to stabilize the composition against oxidative deterioration.

14. 9,10-bis(3,5-di-tert-butyl - 4 - hydroxybenzyl)anthracene.

15. 1,4-bis(3,5 - diisopropyl-4-hydroxybenzyl)naphthalene.

References Cited in the file of this patent

UNITED STATES PATENTS

| | | |
|---|---|---|
| 2,330,722 | Lieber | Sept. 28, 1943 |
| 2,955,037 | Smith | Oct. 4, 1960 |